United States Patent
Lin et al.

(10) Patent No.: US 9,379,563 B2
(45) Date of Patent: Jun. 28, 2016

(54) CHARGER

(71) Applicants: Pei-Jen Lin, Taipei (TW); Chang-Hua Wei, Taipei (TW); Pei-Pin Huang, Taipei (TW); Ting-Wei Wu, Taipei (TW); Chun-Liang Wu, Taipei (TW); Hung-Sung Pan, Taipei (TW)

(72) Inventors: Pei-Jen Lin, Taipei (TW); Chang-Hua Wei, Taipei (TW); Pei-Pin Huang, Taipei (TW); Ting-Wei Wu, Taipei (TW); Chun-Liang Wu, Taipei (TW); Hung-Sung Pan, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 136 days.

(21) Appl. No.: 14/265,368

(22) Filed: Apr. 30, 2014

(65) Prior Publication Data

US 2015/0130415 A1    May 14, 2015

Related U.S. Application Data

(60) Provisional application No. 61/904,443, filed on Nov. 14, 2013.

(51) Int. Cl.
*H02J 7/00* (2006.01)
*G04R 60/12* (2013.01)
*G06F 1/16* (2006.01)
(Continued)

(52) U.S. Cl.
CPC ............ *H02J 7/0045* (2013.01); *A44C 5/0007* (2013.01); *G04R 60/12* (2013.01); *G06F 1/163* (2013.01); *G06F 1/1613* (2013.01); *G06F 1/1626* (2013.01); *G06F 1/1654* (2013.01); *G06F 1/26* (2013.01); *G06F 3/014* (2013.01); *H01Q 1/273* (2013.01); *H02J 7/0044* (2013.01);
(Continued)

(58) Field of Classification Search
CPC ..... H02J 7/0044; H02J 7/0045; H02J 7/0052; H02J 7/0027; H02J 2007/0062; H02J 7/0013; H02J 7/0047; H02J 7/0029; H02J 7/0003; G06F 1/1613; G06F 1/26; G06F 1/1626; G06F 1/163; G06F 1/1654; G06F 3/014; G04R 60/12; A61M 2209/08
USPC ................. 320/106, 107, 110, 113, 114, 115
See application file for complete search history.

(56) References Cited

U.S. PATENT DOCUMENTS

| 7,045,989 B2 * | 5/2006 | Sakakibara | ........... H02J 7/0026 320/106 |
| 2002/0156537 A1 * | 10/2002 | Sakakibara | ........... H02J 7/0026 700/1 |

(Continued)

FOREIGN PATENT DOCUMENTS

| TW | M358461 | 6/2009 |
| TW | M409630 | 8/2011 |
| TW | M419332 | 12/2011 |

OTHER PUBLICATIONS

"Office Action of Taiwan Counterpart Application", issued on Jun. 15, 2015, p. 1-p. 5, in which the listed references were cited.

*Primary Examiner* — Helen Rossoshek
(74) *Attorney, Agent, or Firm* — Jianq Chyun IP Office (57) ABSTRACT

A charger including a base and a clamping component is provided. The base includes a first charging portion and a second charging portion. The clamping component is connected to the base and aligned to the first charging portion and the second charging portion. A first charging space is formed between the clamping component and the first charging portion, and a second charging space is formed between the clamping component and the second charging portion.

14 Claims, 8 Drawing Sheets

(51) Int. Cl.
  *H01Q 1/27*  (2006.01)
  *G06F 3/01*  (2006.01)
  *A44C 5/00*  (2006.01)
  *G06F 1/26*  (2006.01)

(52) U.S. Cl.
  CPC ............ *H02J 7/0013* (2013.01); *H02J 7/0027* (2013.01); *H02J 7/0052* (2013.01)

(56) References Cited

U.S. PATENT DOCUMENTS

| | | | | |
|---|---|---|---|---|
| 2003/0025476 A1* | 2/2003 | Trela | ............ | H02J 7/0003 320/107 |
| 2004/0135541 A1* | 7/2004 | Cho | ............ | H02J 7/0044 320/107 |
| 2004/0145343 A1* | 7/2004 | Naskali | ............ | H02J 7/0027 320/108 |
| 2005/0088141 A1* | 4/2005 | Lee | ............ | A45F 5/00 320/114 |
| 2005/0134217 A1* | 6/2005 | Sin | ............ | H02J 7/0008 320/114 |
| 2005/0174094 A1* | 8/2005 | Purdy | ............ | H02J 7/0052 320/134 |
| 2005/0253554 A1* | 11/2005 | DiFazio | ............ | H02J 7/00 320/114 |
| 2006/0232239 A1* | 10/2006 | Maglica | ............ | H02J 7/0045 320/107 |
| 2007/0090787 A1* | 4/2007 | Yu | ............ | H02J 7/0068 320/104 |
| 2008/0007212 A1* | 1/2008 | Theytaz | ............ | H02J 7/0013 320/107 |
| 2008/0258679 A1* | 10/2008 | Manico | ............ | H02J 7/025 320/106 |
| 2009/0134839 A1* | 5/2009 | Lin | ............ | H02J 7/0045 320/110 |
| 2009/0267560 A1* | 10/2009 | Toya | ............ | H01M 2/1022 320/108 |
| 2010/0102777 A1* | 4/2010 | Sa | ............ | H02J 7/0044 320/115 |
| 2014/0140048 A1* | 5/2014 | Miller | ............ | H02J 7/0027 362/183 |
| 2014/0291469 A1* | 10/2014 | Zito | ............ | F16M 11/046 248/452 |
| 2014/0320066 A1* | 10/2014 | Huang | ............ | H02J 7/0042 320/107 |
| 2015/0028797 A1* | 1/2015 | Miller | ............ | H02J 7/0042 320/103 |
| 2015/0244195 A1* | 8/2015 | Chen | ............ | H02J 7/0044 320/108 |

* cited by examiner

CHARGER

CROSS-REFERENCE TO RELATED APPLICATION

This application claims the priority benefits of U.S. provisional application Ser. No. 61/904,443, filed on Nov. 14, 2013. The entirety of the above-mentioned patent application is hereby incorporated by reference herein and made a part of this specification.

BACKGROUND OF THE INVENTION

1. Field of the Invention

The invention relates to a charger, and more particularly to a charger having multiple charging portions.

2. Description of Related Art

With an advancement of the technology, human beings tend to rely on electronic device to a greater degree. To meet the requirement of a light, thin, compact and high performance handheld electronic device, various handheld electronic device, such as ultra mobile personal computer (UMPC), tablet PC, pocket PC, personal digital assistant (PDA) and cell phone, are provided. Accordingly, various portable electronic devices such as notebook computers, tablet PCs and smart phones are gradually popularized in consumer market. In addition, in order to meet market trends and consumer expectations, wearable devices (e.g., a smart watch) are also gradually popularized.

A battery of the portable electronic devices and the wearable devices may be charged through a charger. In case a user owns multiple electronic devices together with their accessories, multiple chargers are usually required for said devices and accessories. As a result, it is inconvenient in storing or carrying the chargers, and the user may be confuse in using multiple chargers.

SUMMARY OF THE INVENTION

The invention is directed to a charger capable of charging different types of electronic devices or the accessories thereof.

A charger of the invention includes a base and a clamping component. The base includes a first charging portion and a second charging portion. The clamping component is connected to the base and aligned to the first charging portion and the second charging portion. A first charging space is formed between the clamping component and the first charging portion, and a second charging space is formed between the clamping component and the second charging portion.

In an embodiment of the invention, a first electronic device is adapted to be clamped between the clamping component and the first charging portion and charged through the first charging portion, and a second electronic device is adapted to be clamped between the clamping component and the second charging portion and charged through the second charging portion.

In an embodiment of the invention, the first charging portion has a plurality of first electrical contacts, and the second charging portion has a plurality of second electrical contacts.

In an embodiment of the invention, a quantity of the first electrical contacts is different from a quantity of the second electrical contacts.

In an embodiment of the invention, a distance between the first charging portion and the clamping component is greater than a distance between the second charging portion and the clamping component.

In an embodiment of the invention, a thickness of the first charging portion is less than a thickness of the second charging portion.

In an embodiment of the invention, the base includes a first connecting portion, and the clamping component is movably connected to the first connecting portion to be adapted to rotate in relative to the base, so as to change the distance between the clamping component and the first charging portion and change the distance between the clamping component and the second charging portion.

In an embodiment of the invention, the clamping component includes a clamping portion, a pressing portion and a second connecting portion. The second connecting portion is pivoted to the first connecting portion; the first charging portion and the second charging portion are aligned to the clamping portion; the pressing portion is adapted to be pressed to drive the clamping component to rotate along a rotating direction, so as to increase a distance between the clamping portion and the first charging portion and a distance between the clamping component and the second charging portion.

In an embodiment of the invention, the clamping portion and the pressing portion are connected to different sides of the second connecting portion respectively, and the first charging portion and the second charging portion are located on the same side of the first connecting portion.

In an embodiment of the invention, the charger includes an elastic component in which the elastic component is connected between the base and the clamping component, and the clamping component is adapted to rotate along the rotating direction in resistance to an elastic force of the elastic component.

In an embodiment of the invention, the clamping component includes a first clamping portion, a second clamping portion and a second connecting portion. The second connecting portion is movably connected to the first connecting portion; the first charging portion and the second charging portion are aligned to the first clamping portion and the second clamping portion respectively; the first clamping portion is adapted to be pressed to drive the clamping component to rotate along a first rotating direction to increase a distance between the second clamping portion and the second charging portion; and the second clamping portion is adapted to be pressed to drive the clamping component to rotate along a second direction to increase a distance between the first clamping portion and the first charging portion.

In an embodiment of the invention, the first clamping portion and the second clamping portion are connected to different sides of the second connecting portion respectively, and the first charging portion and the second charging portion are located on different sides of the first connecting portion.

In an embodiment of the invention, the charger includes a first elastic component and a second elastic component. Therein, the first elastic component and the second elastic component are connected between the first connecting portion and the second connecting portion, and the clamping component is adapted to rotate along the first rotating direction in resistance to an elastic force of the first elastic component and adapted to rotate along the second direction in resistance to an elastic force of the second elastic component.

In an embodiment of the invention, the charger includes a frame. Therein, the frame has an accommodating space; the base is pivoted to the frame and adapted to rotate in relative to the frame to move the first clamping portion or the second clamping portion into the accommodating space; the frame generates elastic deformation and pushes the first clamping portion to drive the clamping component to rotate when the first clamping portion is located in the accommodating space and the frame is pressed; and the frame generates elastic deformation and pushes the second clamping portion to drive the clamping component to rotate when the second clamping portion is located in the accommodating space and the frame is pressed.

In an embodiment of the invention, the frame includes a bottom portion, a top portion and an elastic portion. The elastic portion is connected between the bottom portion and the top portion; the bottom portion and the top portion form the accommodating space; the base is pivoted to the bottom portion; and the elastic portion generates elastic deformation and the top portion pushes the first clamping portion or the second clamping portion when the top portion is pressed.

Based on above, in the charger of the invention, the base further includes the second charging portion in addition to the first charging portion, so that one single charger is capable of charging different types of the electronic devices and the accessories thereof respectively through the first charging portion and the second charging portion. Accordingly, amount of the chargers may be reduced, so that it is convenient in storing or carrying the chargers for the user, and the problem of confusion in using multiple chargers may also be solved.

To make the above features and advantages of the disclosure more comprehensible, several embodiments accompanied with drawings are described in detail as follows.

DESCRIPTION OF THE EMBODIMENTS

Figure 1:
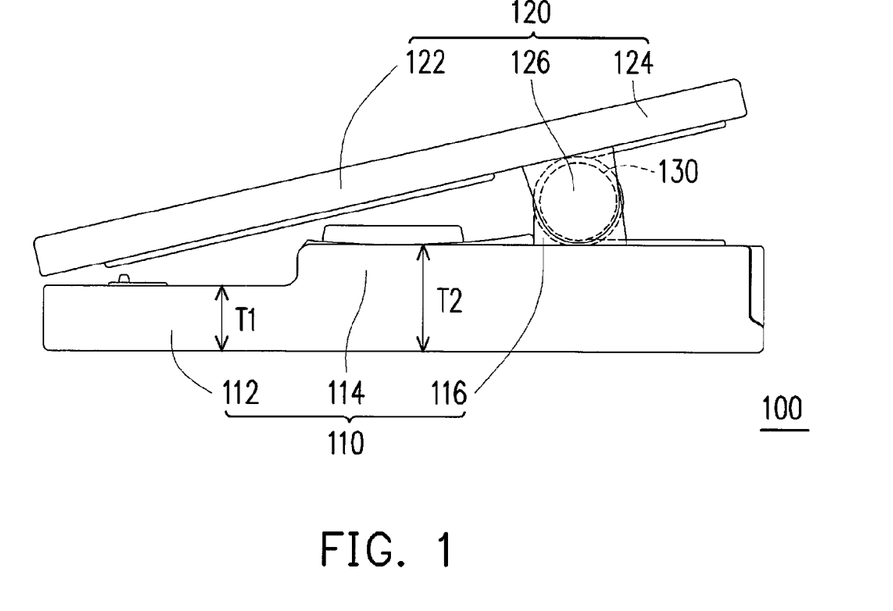
FIG. 1 is a side view of a charger according to an embodiment of the invention.
Figure 2:
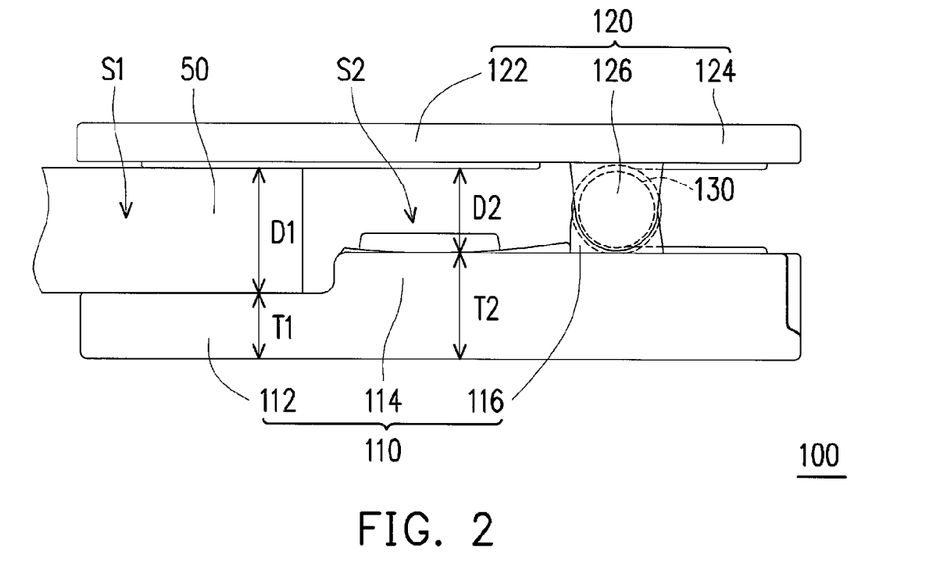
FIG. 2 and FIG. 3 are schematic views of the charger depicted in FIG. 1 charging an electronic device.
Figure 3:
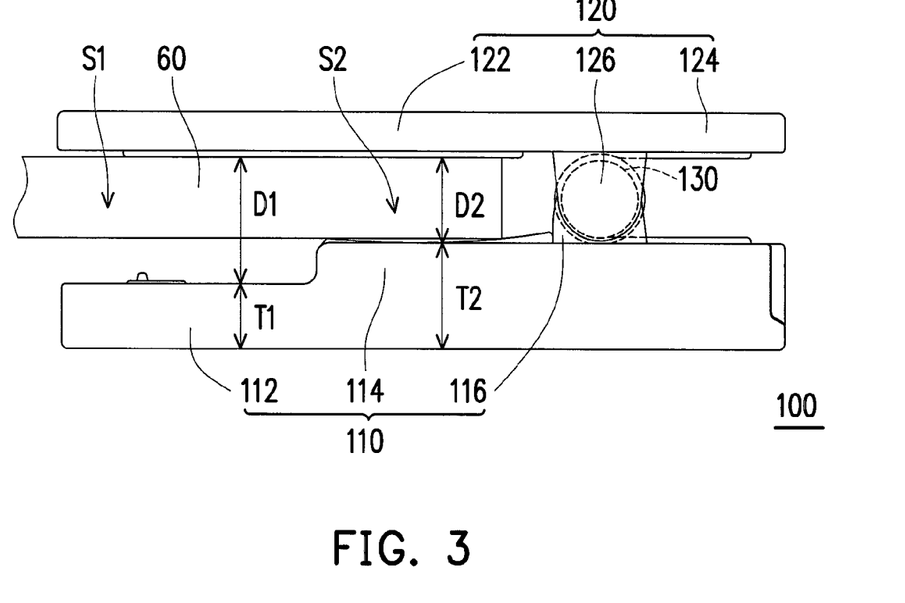

FIG. 1 is a side view of a charger according to an embodiment of the invention. FIG. 2 and FIG. 3 are schematic views of the charger depicted in FIG. 1 charging an electronic device. Referring to FIG. 1 to FIG. 3, a charger 100 of the present embodiment includes a base 110 and a clamping component 120. The base 110 includes a first charging portion 112 and a second charging portion 114. The clamping component 120 is connected to the base 110 and aligned to the first charging portion 112 and the second charging portion 114. A first charging space S1 (marked in FIG. 2 and FIG. 3) is formed between the clamping component 120 and the first charging portion 112, and a second charging space S2 (marked in FIG. 2 and FIG. 3) is formed between the clamping component 120 and the second charging portion 114.

As shown in FIG. 2, a first electronic device 50 is adapted to be clamped between the clamping component 120 and the first charging portion 112 and charged through the first charging portion 112. In addition, as shown in FIG. 3, a second electronic device 60 is adapted to be clamped between the clamping component 120 and the second charging portion 114 and charged through the second charging portion 114. The first electronic device 50 and the second electronic device 60 may be different types of electronic devices including portable electronic devices (e.g., notebook computers, tablet PCs, smart phones) or wearable devices (e.g., smart watches). The first electronic device 50 and the second electronic device 60 may also be an electronic device and an accessory thereof, respectively (e.g., a tablet PC and its expanding base, a watch body of a smart watch and its watch belt and so forth), but the invention is not limited to the above.

With aforesaid disposition, in addition to the first charging portion 112, the base 110 of the charger 100 further includes the second charging portion 114, so that one single charger 100 is capable of charging different types of electronic devices or the accessories thereof respectively through the first charging portion 112 and the second charging portion 114. Accordingly, amount of the chargers may be reduced, so that it is convenient in storing or carrying the chargers for the user, and the problem of confusion in using multiple chargers may also be solved.

In the present embodiment, a thickness T1 of the first charging portion 112 is less than a thickness T2 of the second charging portion 114. Accordingly, when the charger 100 is in states as shown in FIG. 2 and FIG. 3, a distance D1 between the first charging portion 112 and the clamping component 120 is greater than a distance D2 between the second charging portion 114 and the clamping component 120, so that the first electronic device 50 with a greater thickness is adapted to be clamped between the first charging portion 112 and the clamping component 120 as shown in FIG. 2, and the second electronic device 60 with a smaller thickness is adapted to be clamped between the second charging portion 114 and the clamping component 120 as shown in FIG. 3.

Figure 4:
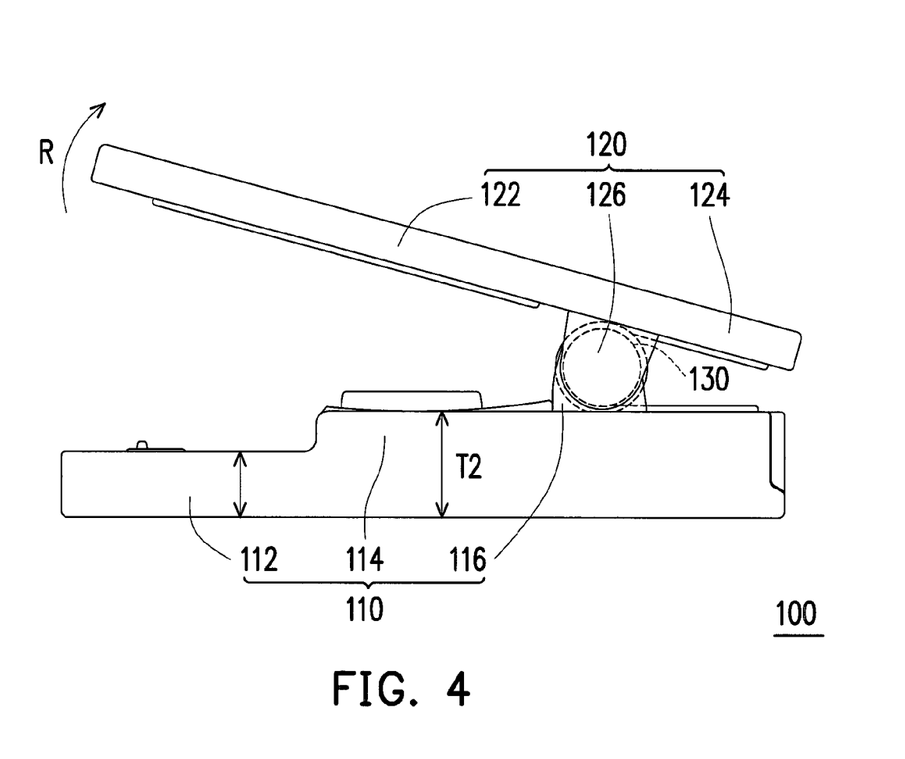
FIG. 4 is a schematic view of the clamping component depicted in FIG. 1 rotating in relative to the base.

FIG. 4 is a schematic view of the clamping component depicted in FIG. 1 rotating in relative to the base. More specifically, the base 110 of the present embodiment includes a first connecting portion 116, and the first charging portion 112 and the second charging portion 114 are located on the same side of the first connecting portion 116. The clamping component 120 includes a clamping portion 122, a pressing portion 124 and a second connecting portion 126. The clamping portion 122 and the pressing portion 124 are connected to different sides the second connecting portion 126 respectively, and the first charging portion 112 and the second charging portion 114 are aligned to the clamping portion 122. The second connecting portion 126 is pivoted to the first connecting portion 116, so that the clamping component 120 is movably connected to the first connecting portion 116. The pressing portion 124 depicted in FIG. 1 is adapted to be pressed to drive the clamping component 120 to rotate along a rotating direction R depicted in FIG. 4 in relative to the base 110, so as to change (e.g., increase) a distance between the clamping portion 122 of the clamping component 120 and the first charging portion 112 and change a distance between the clamping portion 122 of the clamping component 120 and the second charging portion 114. Accordingly, the user may place the first electronic device 50 (illustrated in FIG. 2) between the clamping portion 122 and the first charging portion 122, and place the second electronic device 60 (illustrated in FIG. 3) between the clamping portion 122 and the second charging portion 114.

Furthermore, the charger 100 of the present embodiment includes an elastic component 130. The elastic component 130 is, a torsional spring connected between the base 110 and the clamping component 120 for example. When the user presses the pressing portion 124 of the clamping component 120, the clamping component 120 rotates along the rotating direction R depicted in FIG. 4 in resistance to an elastic force of the elastic component 130. At the time, the user may place the first electronic device 50 on the first charging portion 112 or place the second electronic device 60 on the second charging portion 114. When the user is no longer applying force on the pressing portion 124, the clamping component 120 may return back to original position through the elastic force of the elastic component 130, and clamp the first electronic device 50 as shown in FIG. 2 or clamp the second electronic device 60 as shown in FIG. 3.

Figure 5:
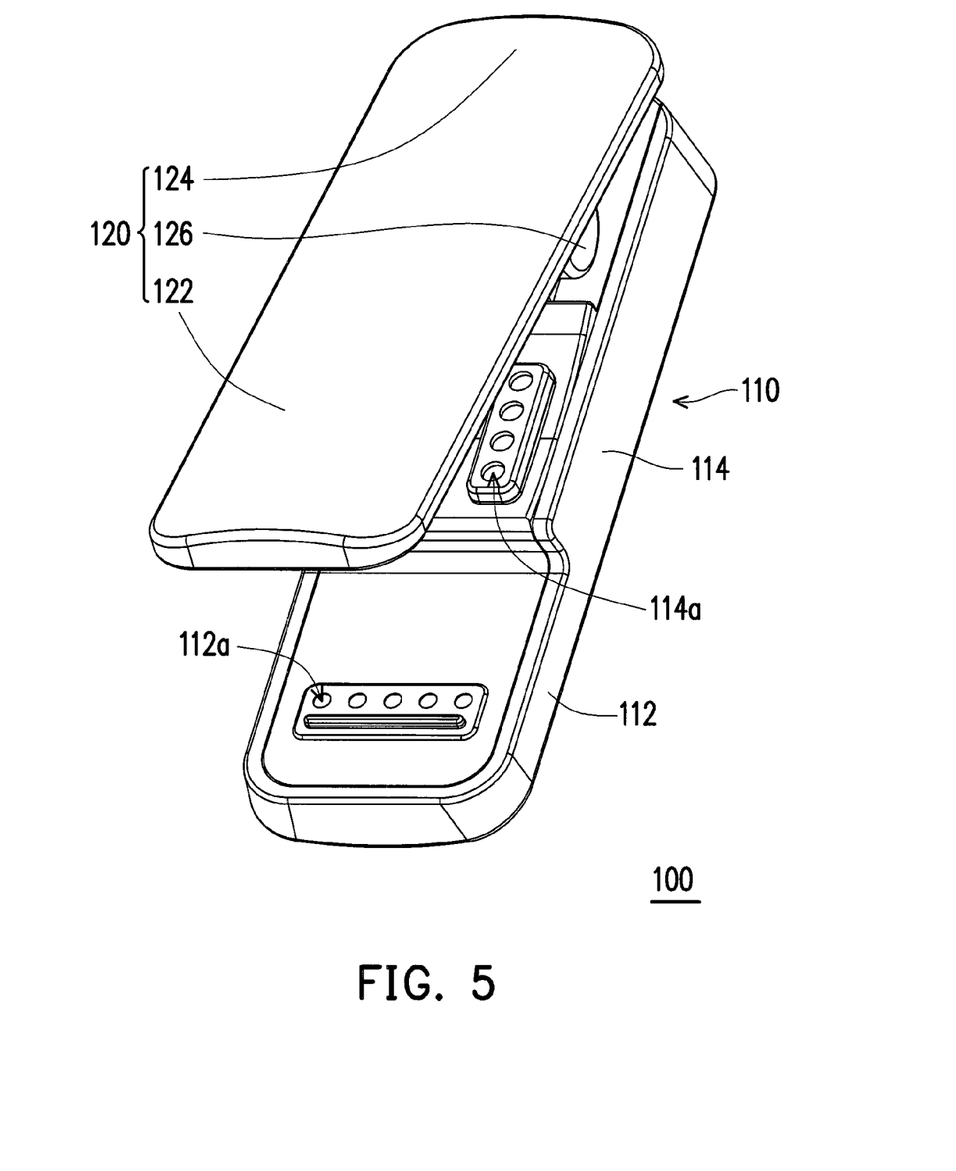
FIG. 5 is a 3D view of the charger depicted in FIG. 4.

FIG. 5 is a 3D view of the charger depicted in FIG. 4. Referring to FIG. 5, in the present embodiment, the first charging portion 112 has a plurality of first electrical contacts 112a, and the second charging portion 114 has a plurality of second electrical contacts 114a. The first electrical contacts 112a and the second electrical contacts 114a may be contacts in different forms to correspond to the first electronic device 50 and the second electronic device 60 each having the electrical contacts in different forms. Moreover, a quantity of the first electrical contacts 112a (e.g., five) is different from a quantity of the second electrical contacts 114a (e.g., four), so as to correspond to the first electronic device 50 and the second electronic device 60 each having different quantities of the electrical contacts.

Figure 6:
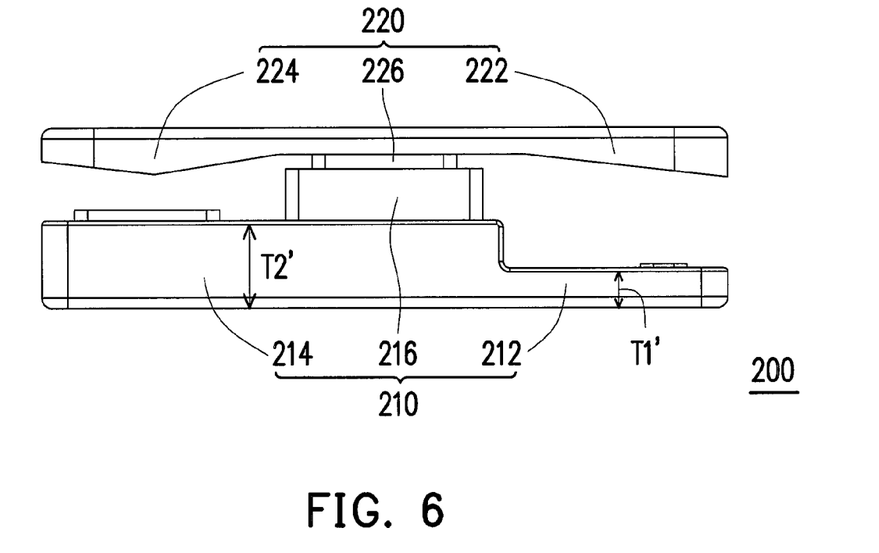
FIG. 6 is a side view of a charger according to another embodiment of the invention.
Figure 7:
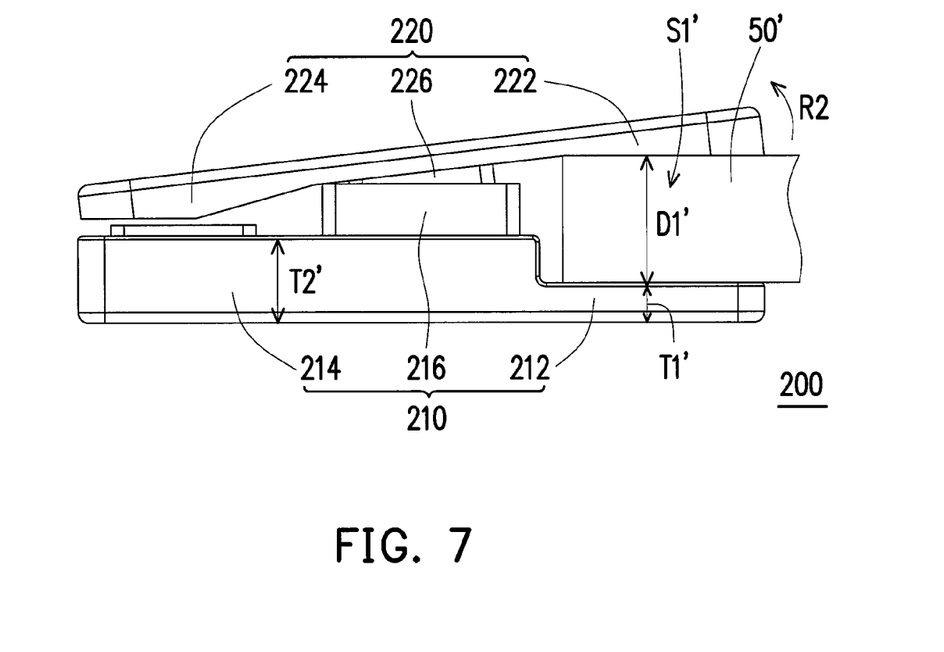
FIG. 7 and FIG. 8 are schematic views of the charger depicted in FIG. 6 charging an electronic device.
Figure 8:
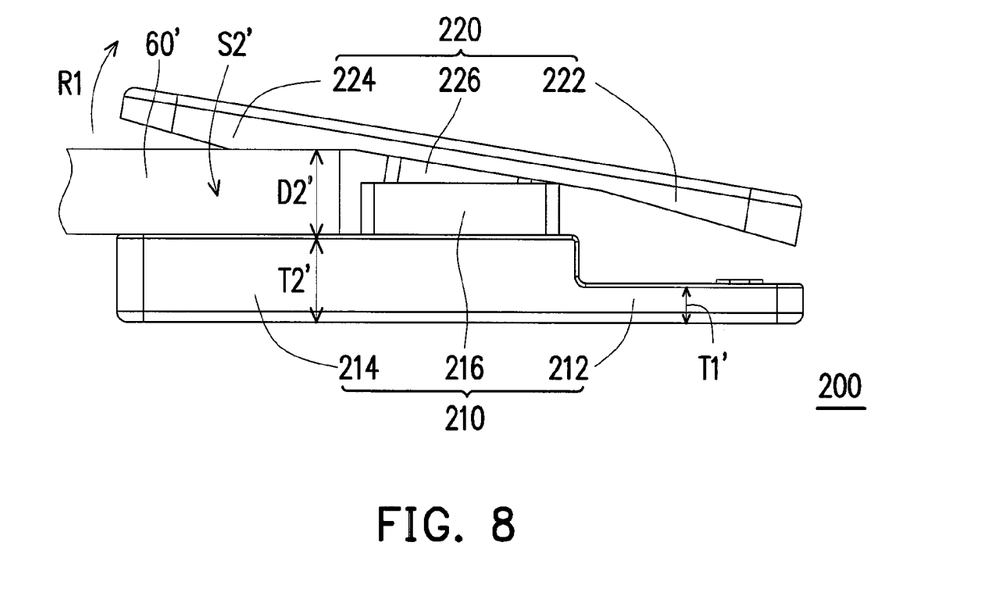

FIG. 6 is a side view of a charger according to another embodiment of the invention. FIG. 7 and FIG. 8 are schematic views of the charger depicted in FIG. 6 charging an electronic device. Referring to FIG. 6 to FIG. 8, a charger 200 of the present embodiment includes a base 210 and a clamping component 220. The base 210 includes a first charging portion 212 and a second charging portion 214. The clamping component 220 is connected to the base 210 and aligned to the first charging portion 212 and the second charging portion 214. A first charging space S1' (marked in FIG. 7) is formed between the clamping component 220 and the first charging portion 212, and a second charging space S2' (marked in FIG. 8) is formed between the clamping component 220 and the second charging portion 214.

As shown in FIG. 7, a first electronic device 50' is adapted to be clamped between the clamping component 220 and the first charging portion 212 and charged through the first charging portion 212. In addition, as shown in FIG. 8, a second electronic device 60' is adapted to be clamped between the clamping component 220 and the second charging portion 214 and charged through the second charging portion 214. The first electronic device 50' and the second electronic device 60' may be different types of electronic devices including portable electronic devices (e.g., notebook computers, tablet PCs, smart phones) or wearable communication devices (e.g., smart watches). The first electronic device 50' and the second electronic device 60' may also be an electronic device and an accessory thereof, respectively (e.g., a tablet PC and its expanding base, a watch body of a smart watch and its watch belt and so forth), but the invention is not limited to the above.

With aforesaid disposition, in addition to the first charging portion 212, the base 210 of the charger 200 further includes the second charging portion 214, so that one single charger 200 is capable of charging different types of electronic devices or the accessories thereof respectively through the first charging portion 212 and the second charging portion 214. Accordingly, amount of the chargers may be reduced, so that it is convenient in storing or carrying the chargers for the user, and the problem of confusion in using multiple chargers may also be solved.

In the present embodiment, a thickness T1' of the first charging portion 212 is less than a thickness T2' of the second charging portion 214. Accordingly, a distance D1' between the first charging portion 212 and the clamping component 220 is greater when the charger 200 is in state as shown in FIG. 7, and a distance D2' between the second charging portion 214 and the clamping component 220 is smaller when the charger 200 is in state as shown in FIG. 8, so that the first electronic device 50' with a greater thickness is adapted to be clamped between the first charging portion 212 and the clamping component 220 as shown in FIG. 7, and the second electronic device 60' with a smaller thickness is adapted to be clamped between the second charging portion 214 and the clamping component 220 as shown in FIG. 8.

More specifically, the base 210 of the present embodiment includes a first connecting portion 216, and the first charging portion 212 and the second charging portion 214 are located on the different sides of the first connecting portion 216, respectively. The clamping component 220 includes a first clamping portion 222, a second clamping portion 224 and a second connecting portion 226. The first clamping portion 222 and the second clamping portion 224 are connected to different sides of the second connecting portion 226, respectively. The second connecting portion 226 is movably connected to the first connecting portion 216. The first charging portion 212 and the second charging portion 214 are aligned to the first clamping portion 222 and the second clamping portion 224, respectively. The first clamping portion 222 depicted in FIG. 6 is adapted to be pressed to drive the clamping component 220 to rotate along a first rotating direction R1 depicted in FIG. 8, so as to increase a distance between the second clamping portion 224 and the second charging portion 214, such that the user may place the second electronic device 60' between the second clamping portion 224 and the second charging portion 214. In addition, the second clamping portion 224 depicted in FIG. 6 is adapted to be pressed to drive the clamping component 220 to rotate along a second rotating direction R2 depicted in FIG. 7, so as to increase a distance between the first clamping portion 222 and the first charging portion 212, such that the user may place the first electronic device 50' between the first clamping portion 222 and the first charging portion 212.

Figure 9:
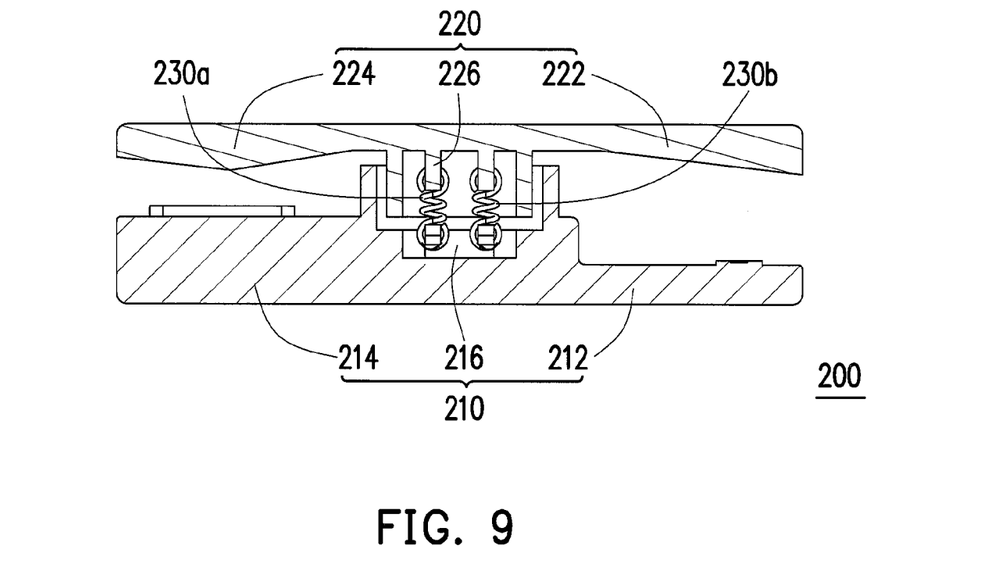
FIG. 9 to FIG. 11 are cross-sectional views of FIG. 6 to FIG. 8, respectively.
Figure 10:
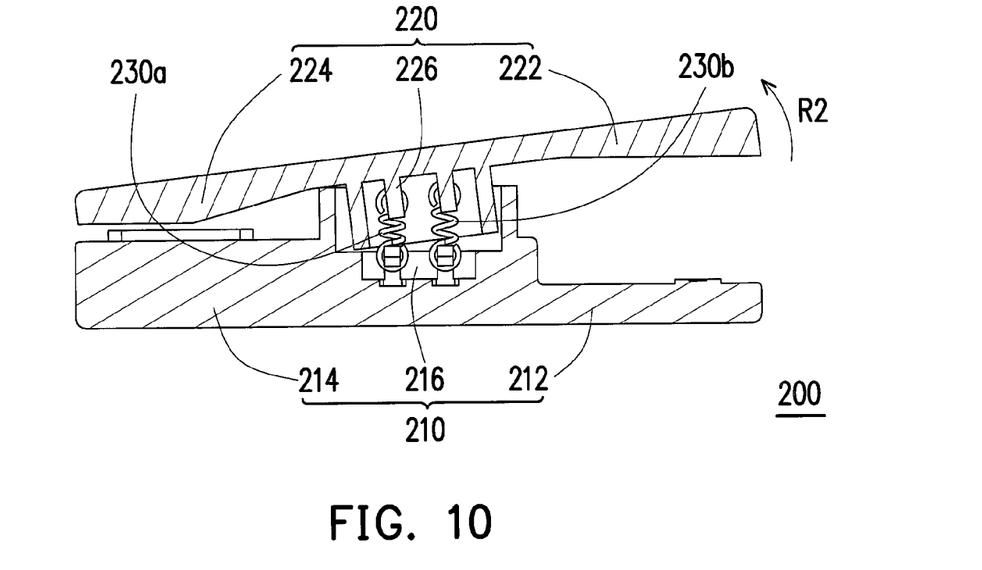
Figure 11:
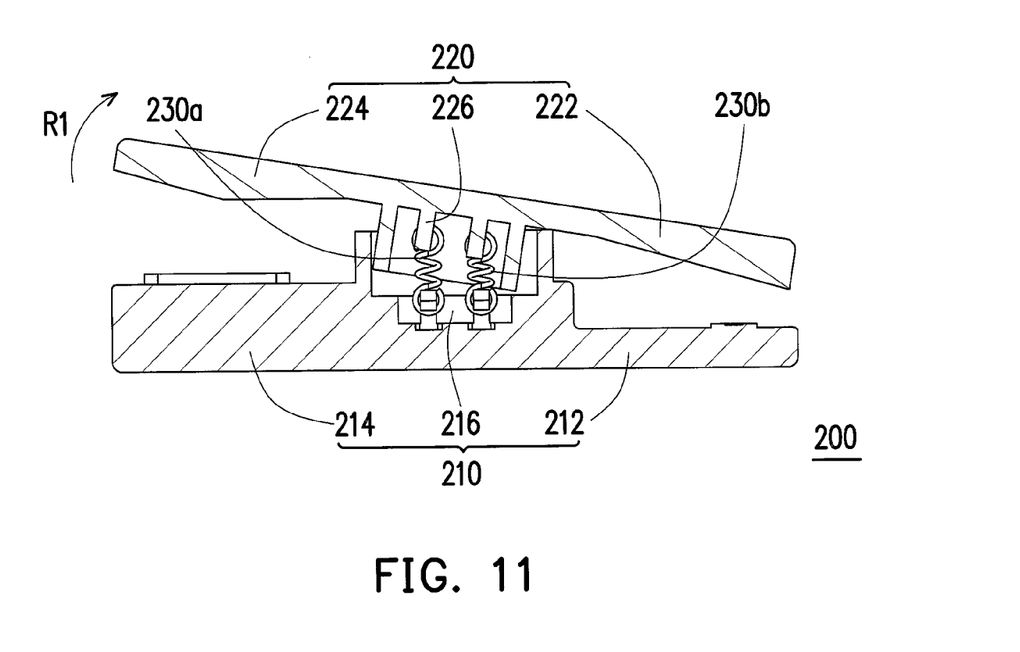

FIG. 9 to FIG. 11 are cross-sectional views of FIG. 6 to FIG. 8, respectively. Referring to FIG. 9 to FIG. 11, more specifically, the charger 200 of the present embodiment includes a first elastic component 230a and a second elastic component 230b. The first elastic component 230a and the second elastic component 230b are, for example, extension springs connected between the first connecting portion 216 and the second connecting portion 226. When the user presses the first clamping portion 222 of the clamping component 220, the clamping component 220 rotates along the first rotating direction R1 in resistance to an elastic force of the first elastic component 230a as shown in FIG. 8 and FIG. 11. At the time, the user may place the second electronic device 60' (illustrated in FIG. 8) on the second charging portion 214, and the first elastic component 230a is extended. When the user is no longer applying force on the first clamping portion 222, the clamping portion 220 may clamp the second electronic device 60' through the elastic force of the first elastic component 230a. Similarly, when the user presses the second clamping portion 224 of the clamping component 220, the clamping component 220 rotates along the second rotating direction R2 in resistance to an elastic force of the second elastic component 230b as shown in FIG. 7 and FIG. 10. At the time, the user may place the first electronic device 50' (illustrated in FIG. 7) on the first charging portion 212, and the second elastic component 230b is extended. When the user is no longer applying force on the second clamping portion 224, the clamping portion 220 may clamp the first electronic device 50' through the elastic force of the second elastic component 230b.

Figure 12:
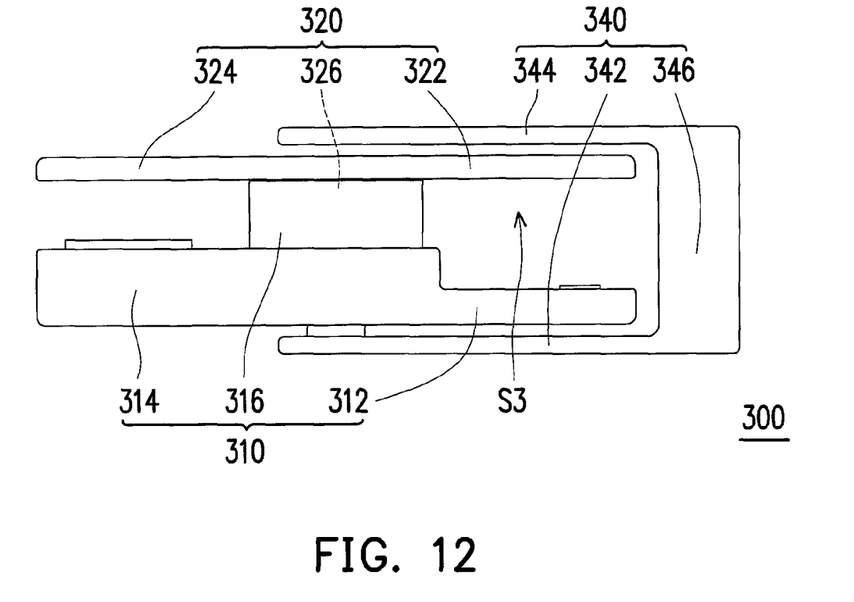
FIG. 12 is a side view of a charger according to another embodiment of the invention.
Figure 13:
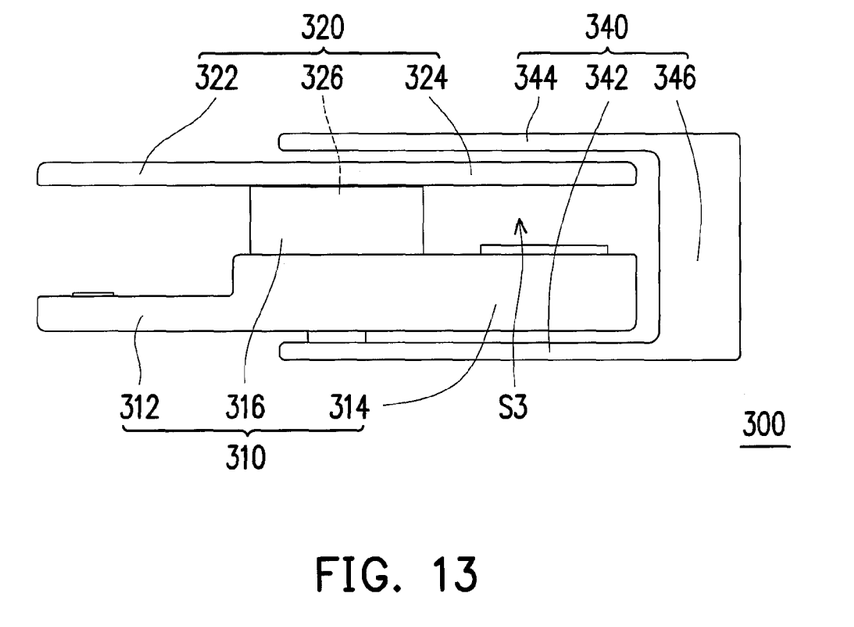
FIG. 13 is a schematic view illustrates rotation of the base depicted in FIG. 12.
Figure 14:
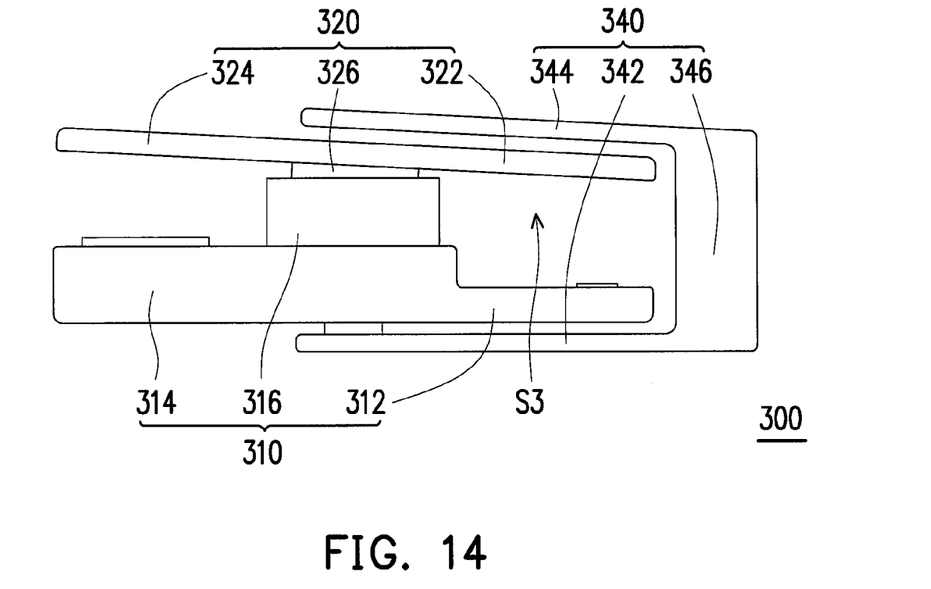
FIG. 14 and FIG. 15 are schematic views respectively illustrating the clamping component depicted in FIG. 12 and FIG. 13 being pushed.
Figure 15:
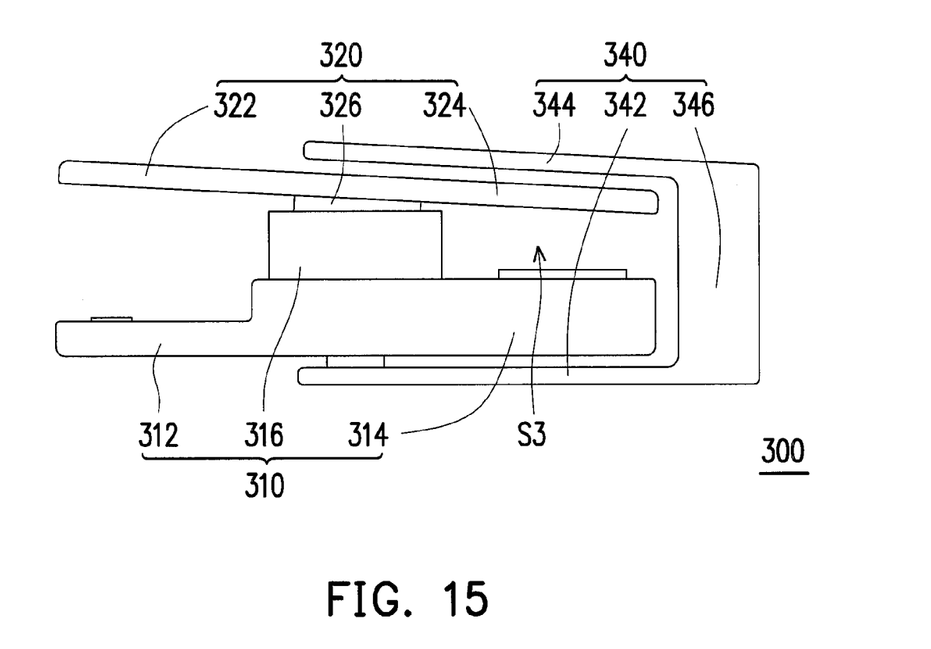

FIG. 12 is a side view of a charger according to another embodiment of the invention. FIG. 13 is a schematic view illustrates rotation of the base depicted in FIG. 12. FIG. 14 and FIG. 15 are schematic views respectively illustrating the clamping component depicted in FIG. 12 and FIG. 13 being pushed. In a charger 300 illustrated in FIG. 12 to FIG. 15, dispositions and actions regarding a base 310, a first charging portion 312, a second charging portion 314, a first connecting portion 316, a clamping component 320, a first clamping portion 322, a second clamping portion 324 and a second connecting portion 326 are similar to dispositions and actions regarding the base 210, the first charging portion 212, the second charging portion 214, the first connecting portion 216, the clamping component 220, the first clamping portion 222, the second clamping portion 224 and the second connecting portion 226 as shown in FIG. 6 to FIG. 11, thus related description is omitted hereinafter.

A difference between the charger 300 and the charger 200 is that, the charger 300 further includes a frame 340. The frame 340 includes a bottom portion 342, a top portion 344 and an elastic portion 346, and has an accommodating space S3. The elastic portion 346 is connected between the bottom portion 342 and the top portion 344, and the accommodating space S3 is formed between the bottom portion 342 and the top portion 344. The base 310 is pivoted to the bottom portion 342 of the frame 340 and adapted to rotate in relative to the frame 340 to move the first clamping portion 322 into the accommodating space S3 as shown in FIG. 12, or move the second clamping portion 324 into the accommodating space S3 as shown in FIG. 13.

When the first clamping portion 322 is located in the accommodating space S3 and the top portion 344 of the frame 340 is pressed as shown in FIG. 14, the elastic portion 346 of the frame 340 generates elastic deformation and the top portion 344 pushes the first clamping portion 322 to drive the clamping component 320 to rotate. In this case, a distance between the second clamping portion 324 and the second charging portion 314 is increased, such that the user may place the electronic device (not illustrated) between the second clamping portion 324 and the second charging portion 314. Similarly, when the second clamping portion 324 is located in the accommodating space S3 and the top portion 344 of the frame 340 is pressed as shown in FIG. 15, the elastic portion 346 of the frame 340 generates elastic deformation and pushes the second clamping portion 324 to drive the clamping component 320 to rotate. In this case, a distance between the first clamping portion 322 and the first charging portion 312 is increased, such that the user may place the electronic device (not illustrated) between the first clamping portion 322 and the first charging portion 312.

In summary, in the charger of the invention, the base further includes the second charging portion in addition to the first charging portion, so that one single charger is capable of charging different types of the electronic devices and the accessories thereof respectively through the first charging portion and the second charging portion. Accordingly, amount of the chargers may be reduced, so that it is convenient in storing or carrying the chargers for the user, and the problem of confusion in using multiple chargers may also be solved. In addition, the clamping component is designed to act with respect to the base to change the distance between the clamping portion and the charging portion, so that the user may place the electronic device between the clamping portion and the charging portion, so that the operations of the charger may be easier.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A charger, comprising:
   a base comprising a first charging portion and a second charging portion; and
   a clamping component connected to the base and aligned to the first charging portion and the second charging portion, wherein a first charging space is formed between the clamping component and the first charging portion, and a second charging space is formed between the clamping component and the second charging portion,
   wherein the base comprises a first connecting portion, and the clamping component is movably connected to the first connecting portion to be adapted to rotate in relative to the base, so as to change the distance between the clamping component and the first charging portion and change the distance between the clamping component and the second charging portion.

2. The charger of claim 1, wherein a first electronic device is adapted to be clamped between the clamping component and the first charging portion and charged through the first charging portion, and a second electronic device is adapted to be clamped between the clamping component and the second charging portion and charged through the second charging portion.

3. The charger of claim 1, wherein the first charging portion has a plurality of first electrical contacts, and the second charging portion has a plurality of second electrical contacts.

4. The charger of claim 3, wherein a quantity of the first electrical contacts is different from a quantity of the second electrical contacts.

5. The charger of claim 1, wherein a distance between the first charging portion and the clamping component is greater than a distance between the second charging portion and the clamping component.

6. The charger of claim 1, wherein a thickness of the first charging portion is less than a thickness of the second charging portion.

7. The charger of claim 1, wherein the clamping component comprises a clamping portion, a pressing portion and a second connecting portion, the second connecting portion being pivoted to the first connecting portion, the first charging portion and the second charging portion being aligned to the clamping portion, the pressing portion being adapted to be pressed to drive the clamping component to rotate along a rotating direction, so as to increase a distance between the clamping portion and the first charging portion and a distance between the clamping component and the second charging portion.

8. The charger of claim 7, wherein the clamping portion and the pressing portion are connected to different sides of the second connecting portion respectively, and the first charging portion and the second charging portion are located on the same side of the first connecting portion.

9. The charger of claim 7, comprising an elastic component, wherein the elastic component is connected between the base and the clamping component, and the clamping component is adapted to rotate along the rotating direction in resistance to an elastic force of the elastic component.

10. The charger of claim 1, wherein the clamping component comprises a first clamping portion, a second clamping portion and a second connecting portion, the second connecting portion being movably connected to the first connecting portion, the first charging portion and the second charging portion being aligned to the first clamping portion and the second clamping portion respectively, the first clamping portion being adapted to be pressed to drive the clamping component to rotate along a first rotating direction to increase a distance between the second clamping portion and the second charging portion, and the second clamping portion being adapted to be pressed to drive the clamping component to rotate along a second direction to increase a distance between the first clamping portion and the first charging portion.

11. The charger of claim 10, wherein the first clamping portion and the second clamping portion are connected to different sides of the second connecting portion respectively, and the first charging portion and the second charging portion are located on different sides of the first connecting portion.

12. The charger of claim 10, comprising a first elastic component and a second elastic component, wherein the first elastic component and the second elastic component are connected between the first connecting portion and the second connecting portion, and the clamping component is adapted to rotate along the first rotating direction in resistance to an elastic force of the first elastic component and adapted to rotate along the second direction in resistance to an elastic force of the second elastic component.

13. The charger of claim 10, comprising a frame, wherein the frame has an accommodating space, the base being pivoted to the frame and adapted to rotate in relative to the frame to move the first clamping portion or the second clamping portion into the accommodating space, the frame generating elastic deformation and pushing the first clamping portion to drive the clamping component to rotate when the first clamping portion is located in the accommodating space and the frame is pressed, and the frame generating elastic deformation and pushing the second clamping portion to drive the clamping component to rotate when the second clamping portion is located in the accommodating space and the frame is pressed.

14. The charger of claim 13, wherein the frame comprises a bottom portion, a top portion and an elastic portion, the elastic portion being connected between the bottom portion and the top portion, the bottom portion and the top portion forming the accommodating space, the base being pivoted to the bottom portion, and the elastic portion generating elastic deformation and the top portion pushing the first clamping portion or the second clamping portion when the top portion is pressed.

\* \* \* \* \*